O. NELSON.
ADJUSTABLE BORING TOOL.
APPLICATION FILED AUG. 7, 1919.
1,392,203.
Patented Sept. 27, 1921.
2 SHEETS—SHEET 1.
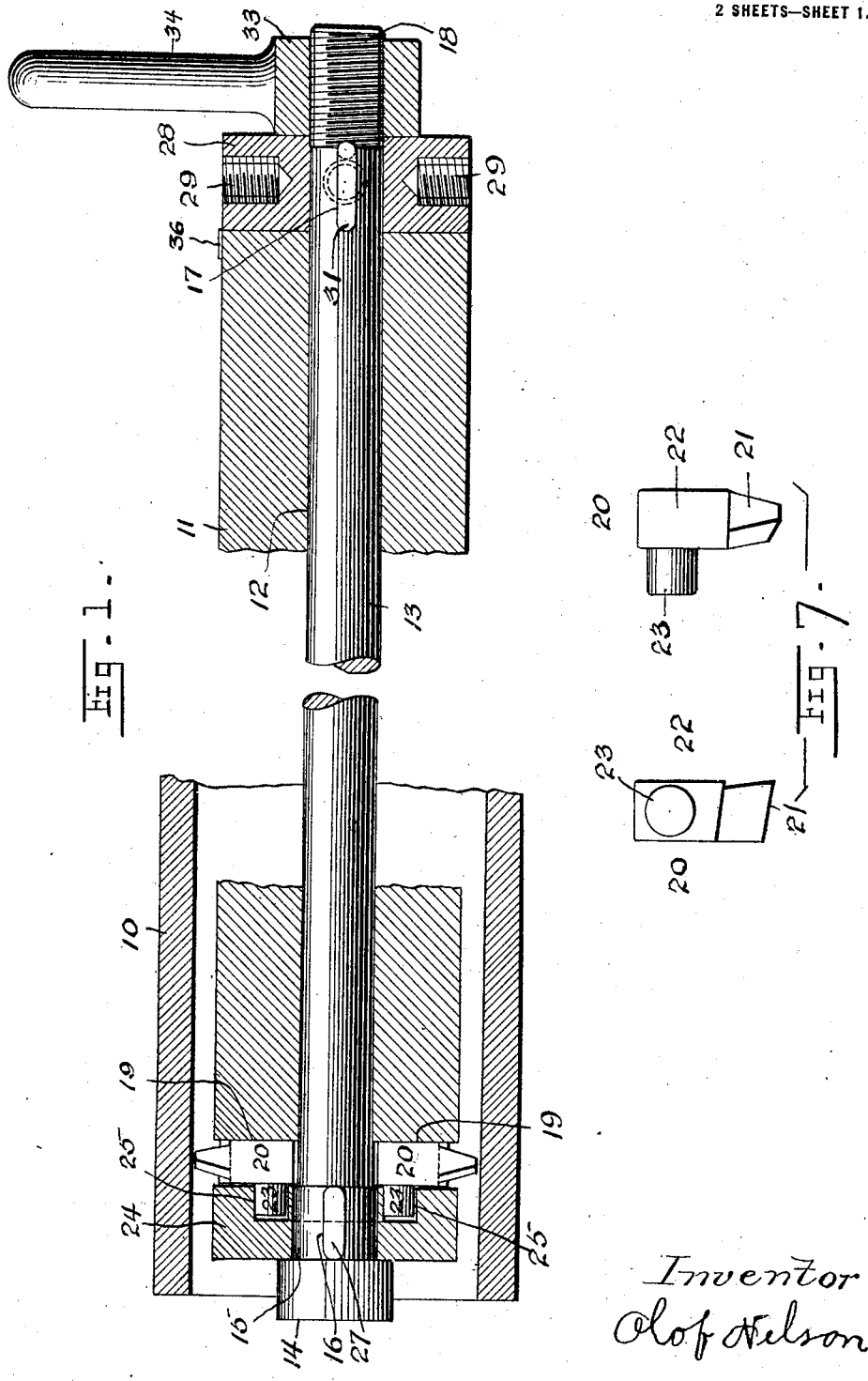
Inventor
Olof Nelson

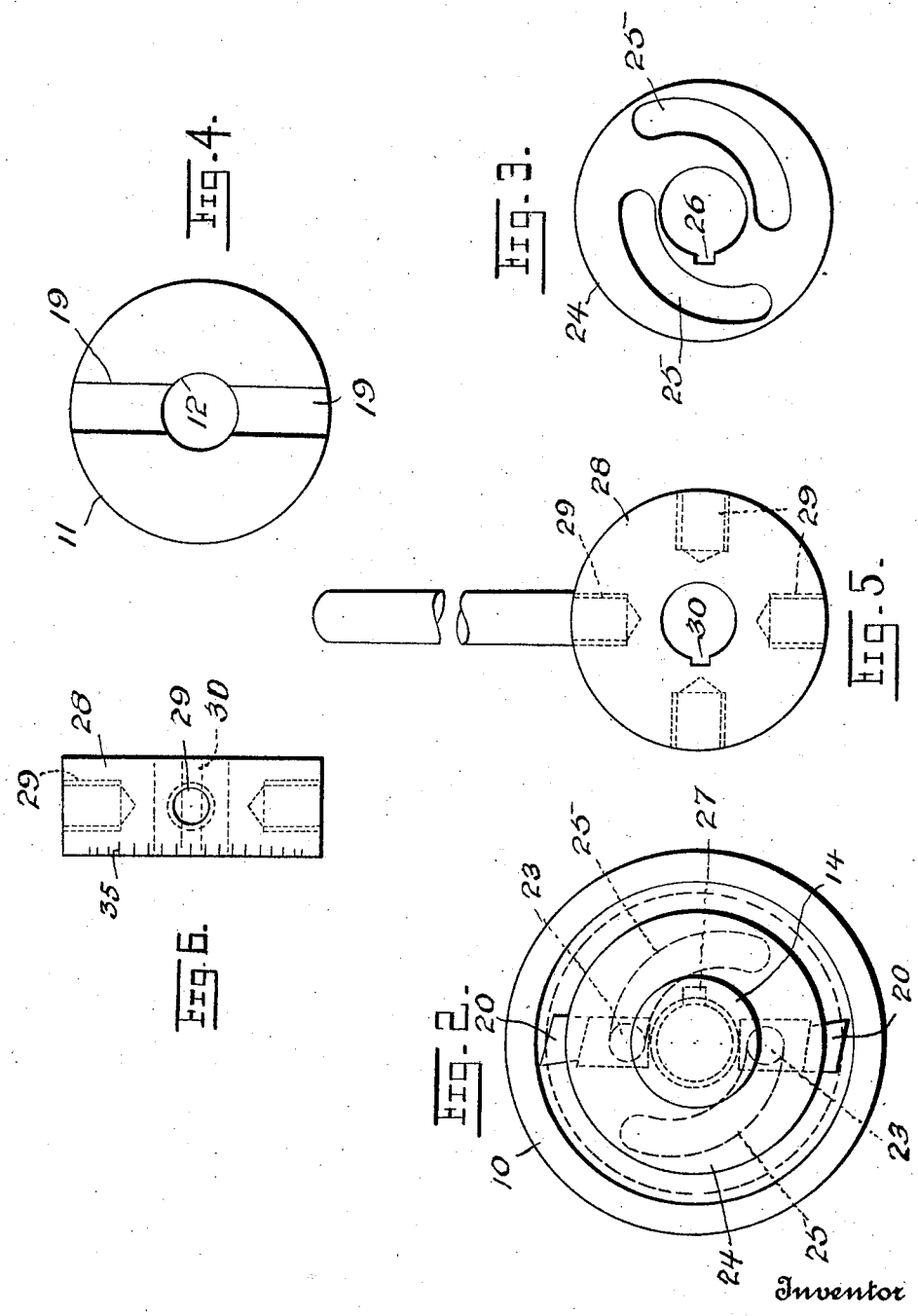

UNITED STATES PATENT OFFICE.

OLOF NELSON, OF BELMONT, MASSACHUSETTS.

ADJUSTABLE BORING-TOOL.

1,392,203.

Specification of Letters Patent. Patented Sept. 27, 1921.

Application filed August 7, 1919. Serial No. 315,998.

(FILED UNDER THE ACT OF MARCH 3, 1883, 22 STAT. L., 625.)

*To all whom it may concern:*

Be it known that I, OLOF NELSON, a citizen of the United States, and a resident of Belmont, county of Middlesex, State of Massachusetts, have invented an Improvement in Adjustable Boring-Tools, of which the following is a specification.

The invention described herein may be used by the Government, or any of its officers or employees in prosecution of work for the Government, or by any other person in the United States, without payment of any royalty thereon.

This invention relates broadly to improvements in adjustable boring tools, and more especially to boring bars for threading elevating slide nuts for gun mounts.

The objects are to provide an adjustable boring bar of simple construction, that may be adjusted without removing same from the work, and one that firmly supports the cutter and prevents its outward as well as inward movement.

A further object is to provide a construction wherein the cutter itself, which is the only part that deteriorates or may need replacement, is of very simple form and requires in its construction, a comparatively small amount of metal.

A further object is to provide means for the adjustment of the cutters from a position that will permit said adjustment after the cutters have traversed the work in either direction; by this means the necessity of withdrawing the tool for adjustment and cutting in only one direction, with its loss of time, may be avoided.

Another object is to provide graduated adjustable means that will accurately indicate the depth of the cut that will be made by the tool.

Similar numerals indicate corresponding parts in all the figures of the drawings, in which:—

Figure 1 is a fragmentary view in longitudinal section of the boring tool, with parts in elevation;

Fig. 2 is a head end elevation of the boring tool;

Fig. 3 is a face view of the cam;

Fig. 4 is a head end elevation of the boring bar;

Fig. 5 is a face view of the adjusting collar with its adjusting lever in place;

Fig. 6 is an edge view of the adjusting collar showing the graduations on its outer face; and Fig. 7 shows front and side views of one of the thread cutters.

Referring to the drawings by numerals, 10 indicates a tubular body such as an elevating slide nut for gun mounts, in which a thread is to be cut.

Since it is not material to this invention, the manner of mounting the work or the boring tool is not shown.

The boring tool consists of a boring bar 11 provided with a central longitudinal bore 12 in which a cam shaft 13 snugly fits and extends a short distance beyond the ends thereof.

The cam shaft 13 is provided with head 14, cam seat 15 and key seat 16 beyond one end of the boring bar and beyond the other end with a portion on which the adjusting collar is mounted, a key seat 17 and a screw threaded portion 18, for the reception of the lock nut.

The cutter end of the boring bar is provided with oppositely arranged radial grooves 19 in which thread cutters 20 are slidably mounted.

The thread cutters 20 have the usual form of cutting tooth 21, the body portion 22 preferably rectangular in cross section, and the lug 23 adapted to operate in a groove in the cam.

The cam 24 having oppositely arranged cam grooves 25, is provided with key seat 26 corresponding to key seat 16 in the cam shaft, in which key 27 is seated to lock the parts against relative rotary movement.

The lugs 23 of the thread cutters are slidably mounted in the cam grooves 25 of the cam 24 and said cutters are adjusted and firmly held by said cam.

By the above construction the thread cutters are mounted for radial adjustment in the end of the boring bar with their lugs 23 in cam grooves 25, the cam 24 is keyed to the cam shaft, and by the rotary movement of the cam shaft 13 and cam 24, the thread cutters may be adjusted out or in as desired.

At the operator's end of the boring bar 11 or the end opposite to the cutter end, the adjusting collar 28 having the lever bar sockets 29 and key seat 30 is keyed to the cam shaft 13 by key 31. By inserting the lever bar 32 in one of the sockets and rotating the adjusting collar 28, the cam shaft 13, cam 24 and thread cutters 20 are adjusted.

On the screw threaded end 18 of the cam shaft is mounted a lock nut 33 having a handle 34 whereby the parts may be firmly locked in position after they have been adjusted.

The adjustable collar may be provided with graduations 35 and the boring bar with an indicating point 36, to indicate the depth of cut or set of the threaded cutters.

The operation is obvious, in that by the rotation of the graduted adjusting collar, the cam 24 is rotated and thread cutters projected or retracted to the desired position. When said adjustment is accomplished, lock nut 33 is operated by lever 34 to clamp the parts of the tool firmly and immovably in place, when the work or tool may be operated to increase the bore of a cylinder or run a thread therein by any well known manner of tool and work support.

Having described my invention, what I claim as new and desire to secure by Letters Patent, is:

1. A boring tool, including a hollow boring bar provided with radial slots in one end thereof, cutting tools mounted for rectilinear sliding movement in the slots, a shaft extending through the hollow bar, means carried by one end of the shaft for engaging the cutting tool and adjusting it by the rotary movement of the shaft, a collar secured to the other end of the shaft and graduations on the collar for indicating the angular displacement of the collar and shaft.

2. A boring tool including a hollow bar, a cutting tool mounted for rectilinear sliding movement in one end of the bar, a shaft extending through the hollow bar, means carried by one end of the shaft for engaging the cutting tool and adjusting it by the rotary movement of the shaft, a collar secured to the other end of the shaft and means for indicating the angular displacement of the collar and shaft.

3. A boring tool, including a hollow bar, a cutting tool mounted for radial movement in one end of the bar, a shaft extending through the bar, a cam secured to one end of the shaft and engaging the cutting tool for adjusting it by the rotary movement of the shaft, a collar secured to the other end of the shaft, an indicator on the bar and graduations on the collar to indicate the angular displacement of the collar and shaft.

OLOF NELSON.